United States Patent [19]
Parks

[11] 4,372,279
[45] Feb. 8, 1983

[54] HEATED FUEL LINE
[75] Inventor: Richard W. Parks, Hayward, Calif.
[73] Assignee: Paccar Inc., Bellevue, Wash.
[21] Appl. No.: 209,712
[22] Filed: Nov. 24, 1980
[51] Int. Cl.³ ............................................. F02M 31/00
[52] U.S. Cl. .................................... 123/557; 123/549; 219/205
[58] Field of Search ................ 123/549, 557; 219/205, 219/206, 207, 202, 306, 307, 528, 548, 549; 338/212, 214; 431/208, 209

[56] References Cited

U.S. PATENT DOCUMENTS

| | | | |
|---|---|---|---|
| 1,119,840 | 12/1914 | Kuhn | 123/549 |
| 1,280,787 | 10/1918 | Curtain | 123/549 |
| 1,461,470 | 7/1923 | Ackley | 123/557 |
| 1,525,824 | 2/1925 | Palmer | 123/549 |
| 3,288,078 | 11/1966 | Hynes | 219/306 |
| 4,055,526 | 10/1977 | Kiyokawa | 219/528 |
| 4,208,996 | 6/1980 | Lancaster | 123/557 |
| 4,309,596 | 1/1982 | Crowley | 338/214 |
| 4,325,345 | 4/1982 | Wilkinson | 123/557 |

FOREIGN PATENT DOCUMENTS

| | | | |
|---|---|---|---|
| 705788 | 4/1941 | Fed. Rep. of Germany | 123/557 |
| 2379235 | 8/1978 | France | 123/557 |
| 52-68627 | 6/1977 | Japan | 123/557 |

*Primary Examiner*—Ronald H. Lazarus
*Attorney, Agent, or Firm*—Owen, Wickersham & Erickson

[57] ABSTRACT

A heated fuel line for preventing solidifying of fuel in the fuel line of an engine in extremely low-temperature environments includes an electrical resistance heating element positioned directly inside the fuel line. A thin, tape-like heating element is preferably employed through the length of the fuel line between the tank and the connection to a fuel filter near the engine. Lead wires extend from the downstream end of the heating element through a fitting which carries the leads to the exterior of the fuel line. The heating element is preferably of a type including a pair of spaced conductor wires covered with and separated by a sheath of a radiation cross-linked polymer which has the property of becoming more conductive in lower temperatures and less conductive in higher temperatures. At lower temperatures, where heating of the fuel in the line is most needed, the element therefore produces the greatest amount of heat.

5 Claims, 4 Drawing Figures

HEATED FUEL LINE

BACKGROUND OF THE INVENTION

The invention relates to heating of a fuel feed line for an engine, e.g. a vehicular engine, and more particularly to an improved fuel line heating system wherein a heating element is positioned directly inside the fuel line.

In extremely cold environments, there are problems of fuel freezing or partially solidifying in fuel lines. Problems are particularly serious with diesel fuel, wherein the content of paraffins has been increasing in recent years. Very low temperatures in such fuels can cause a sludge to form, hindering fuel flow.

Previously, approaches to this problem have involved heating elements applied to fuel lines as tracers, i.e. positioned on the outside of the fuel line coextensive with the line. The electrical resistance elements were applied to vehicle fuel lines and hydraulic lines on aircraft and other equipment which often encounter extremely low temperatures.

The problem with this prior art approach has been a lack of efficiency in transfer of heat from the exterior heating element to the fuel inside the line. The problem of heat transfer was even more serious with vehicular fuel lines covered with steel wires for protection. There has been no efficient way to bring the heat from the heating element to the fuel in the line, and to avoid considerable waste of heat to the surrounding air.

Previously, the positioning of electrical resistance heating wire inside a fuel line did not seem feasible because of the apparent danger of fuel ignition in the event of wire breakage or other failures. The concept of incorporating the heating wire directly inside the fuel line apparently has not previously been suggested because of such considerations.

It is an object of the present invention to improve the efficiency of fuel line heating, as well as the simplicity and cost effectiveness of a fuel line heating system, by incorporating the special type of electrical heating element directly within the fuel line.

SUMMARY OF THE INVENTION

According to the present invention, a heated fuel line for a liquid-fuel engine includes an elongated electrical resistance heating element, positioned inside the fuel line and of substantially less cross-sectional area than the fuel line. A fitting is provided in the fuel line with means connecting the heating element to the exterior of the fuel line, and external wiring leads from the connecting means in an electrical circuit to a power supply associated with the engine. In this way the fuel in the fuel line is heated directly and efficiently by the heating element, and solidifying of fuel in the line in extremely low temperatures is avoided.

A preferred element for use with the invention is a product marketed under the name Thermo-Limit-Tape by Raychem Corporation of Menlo Park, Calif. This product is in tape-like form, with two conductive wires running parallel and encased within an irradiated self-limiting conductive core material, the electrical resistance of which decreases at lower temperatures and increases at higher temperatures so that current flow and heat are provided only where needed along the length of the heating element. The element is self-limiting as to the temperature of which the conductive core material is raised. The core material is coated and sealed with a suitable plastic material, and at the remote end it is simply cut off and capped with plastic material. This type heating element is fail-safe as used within the fuel line, since any breaks in the conductors will simply shut off current flow beyond that point. Sparking within the line is not a serious concern in any event, because there is virtually no oxygen for combustion within a fuel line.

It is therefore among the objects of the invention to provide an improved fuel line heater wherein a heating element is positioned directly within the fuel line to more directly and efficiently heat fuel in the line without the need for external attachment means, wrapping, and heat transfer through the wall of the line. Other objects, advantages and features of the invention will be apparent from the following description of a preferred embodiment, considered in connection with the accompanying drawings.

DESCRIPTION OF A PREFERRED EMBODIMENT

Figure 1:
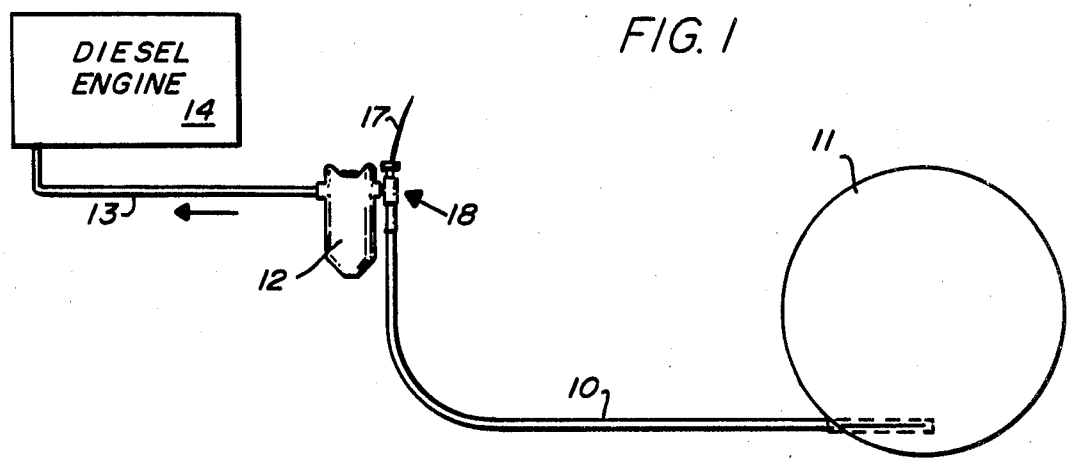
FIG. 1 is a schematic elevational view indicating a fuel line leading from a fuel tank to an engine, such as a vehicle engine, and including an electrical resistance heating element within the fuel line.
Figure 2:
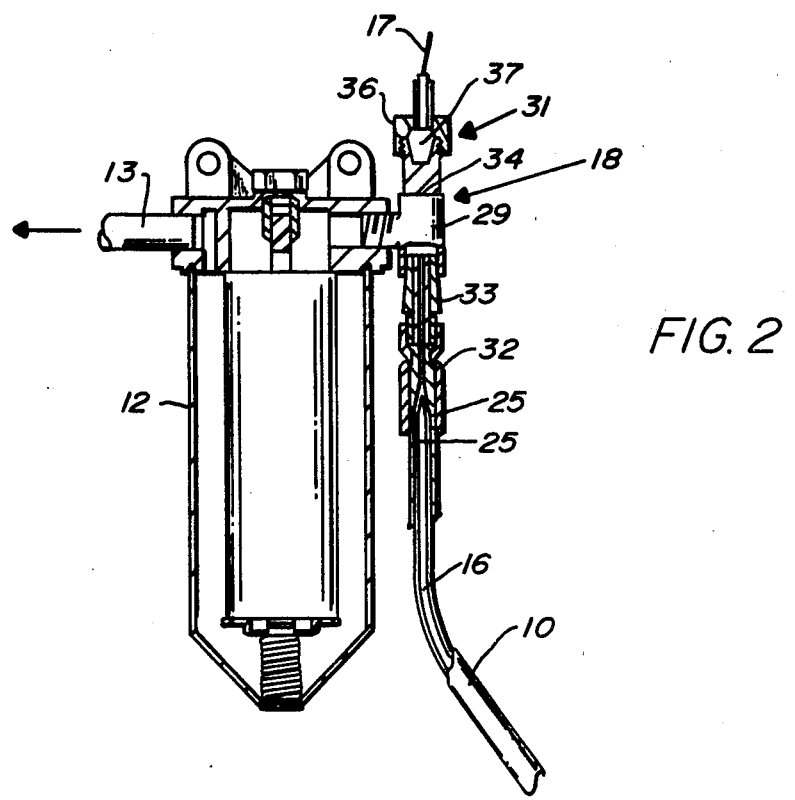
FIG. 2 is an enlarged, partially sectioned view showing a portion of the fuel line and heating element and showing lead wires from the heating element exiting the fuel line.

In the drawing, FIGS. 1 and 2 show a fuel line 10 leading from a fuel tank 11 to a primary fuel filter 12, with another section 13 of the line going from the filter 12 to an engine 14. An electrical resistance heating element 16 is positioned inside the fuel line through substantially the length of the fuel line 10 between the tank 11 and the fuel filter 12. The engine 14 may be a stationary engine or the engine of a vehicle.

Input or lead wires 17 are connected to the heating element 16 which extends out of the fuel line through a special fitting 18 which may be just upstream of the fuel filter 12.

Figure 4:
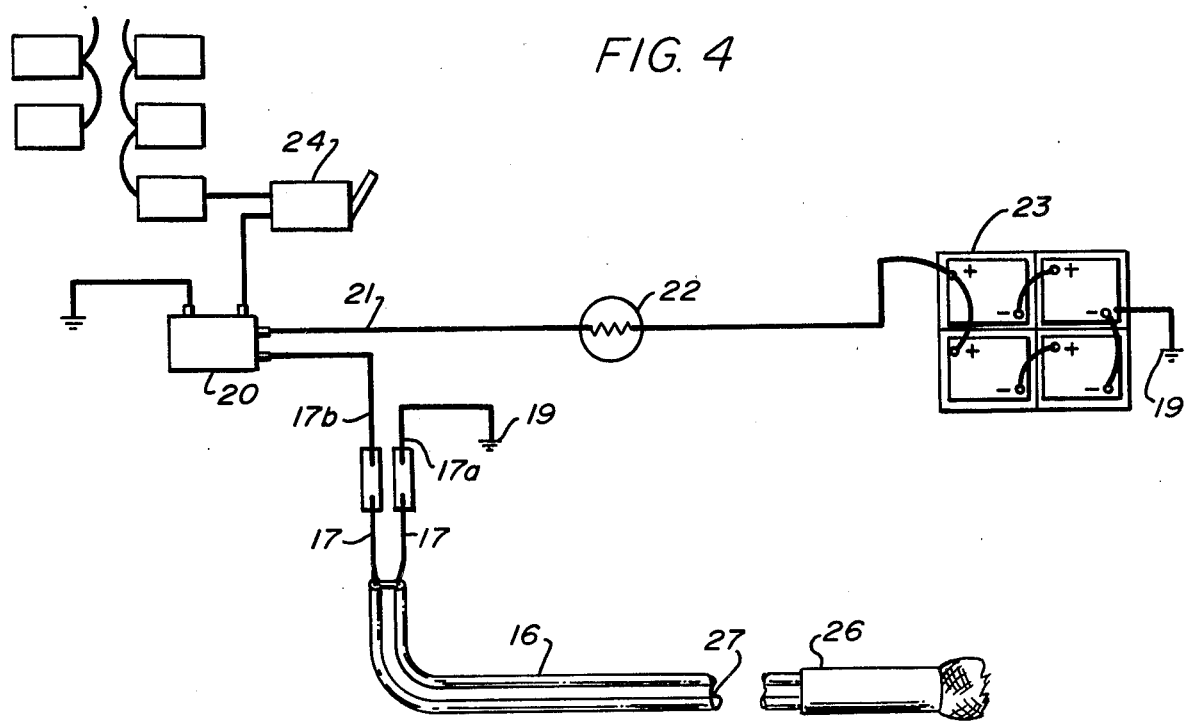
FIG. 4 is a schematic view illustrating a circuit within which the apparatus of the invention may be included.

FIG. 4 shows schematically a typical electrical supply circuit for the heating element 16. The element 16 extends out of the fuel line 10 through the leads of input wires 17, one of which 17a leads to a ground 19. The other lead 17b goes through a grounded remote relay 20 connected through a line 21 and circuit breaker 22 to a power supply 23, including a battery in the case of a vehicle. The switching relay 20 is operated by a toggle switch 24 on the dash of a vehicle or any other appropriate type of switch associated with the engine installation. The battery is connected to another ground 19, so that a circuit is complete when switched on.

Figure 3:
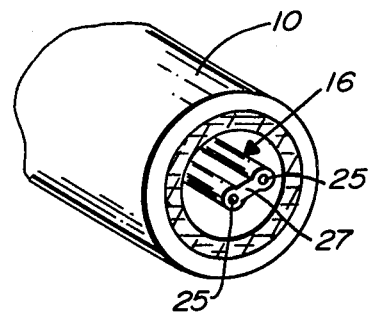
FIG. 3 is a detail view in perspective showing the heating element in the fuel line.

FIG. 3 shows the heating element 16 in greater detail, as positioned within the fuel line 10. As illustrated, the heating element 16 is a generally falt, tape-like device having a pair of conductive wires 25 arranged in parallel and extending the length of the element 16. It is positioned within a typical wire braid-reinforced fuel supply hose 10, as shown. At the upstream end of the element 16 (see FIG. 4), which is adjacent to or inside the fuel tank 11 (See FIG. 1), the element 16 is cut off, with each conductive wire 25 terminating and the two wires not being connected together. A sealing cap 26, preferably of shrinkable plastic material, is put over the end of the element.

As indicated above, the heating element 16 is preferably of a type which produces current flow and consequent heating locally and only in response to need—i.e., the lower the temperature at a particular location along the element 16, the greater the conductivity of the material between the conductive wires. These requirements are advantageously met by a product of Raychem Corporation marketed under the name Thermo-Limit, comprising a conductive core material 27 positioned between the parallel conductive wires 25 and in fact encapsulating them and holding them in the desired spaced relationship. The core material is irradiated to form a cross-linked polymer with free carbon mixed into the polymer. The conductive core material in the Thermo-Limit product is covered by an insulating and protective jacket of plastic material (not separately illustrated). The heating element is thin and tape-like, occupying only a small portion of the cross sectional area inside the fuel line 10, and in many cases not requiring a larger fuel line than that ordinarily used.

At the downstream end of the heating element 16, as illustrated in FIG. 2, the heating element 16 enters the special fitting 18 and thereafter is connected to lead wires 17. The lead wires 17 are totally insulated from each other through the point of connection with the parallel conductive wires 25 of the heating element.

The special fitting 18, as illustrated, may comprise a standard threaded tee 29 connected into the fuel filter 12, and a ferrule-type compression fitting assembly 31 connected into one branch of the tee 29. The fuel line 10, with the heating element 16, enter through the other branch of the tee as shown, with appropriate connectors 32 and 33. This enables the lead wires 17 from the heating element 16 to pass straight out of the line, avoiding sharp bends.

The compression fitting assembly 31 includes typical threaded compression components 34 and 36, but an insert 37 to be compressed between is soft and pliable, for example neoprene rubber. The insert 37 has a shaped opening (not shown) for the heating element 16, and compression seals the insert 37 against the outside of the element 16.

Other suitable arrangements for connecting the heating element 16 to wiring exterior of the fuel line may be used, such as insulated terminals which carry the current to the exterior of the fitting 18 (not shown), but the illustrated arrangement is preferred.

The above described preferred embodiment is illustrative of the principles of the invention and is not intended to be limiting. Variations to this preferred embodiment will be apparent to those skilled in the art and may be made without departing from the spirit and scope of the invention as defined in the following claims.

I claim:
1. A heated fuel line for a liquid-fuel engine having a fuel tank, a fuel line leading from the tank to the engine, and an electrical power supply, comprising:
   an elongated electrical resistance heating element, comprising a pair of parallel conductive wires spaced apart and covered by a non-metallic resistance sheath in the shape of a flat, thin tape,
   said element being inside the fuel line and of substantially less cross sectional area than the fuel line;
   a fitting in the fuel line with means connecting the heating element to the exterior of the fuel line; and
   external wiring connecting the connecting means and both wires of the heating element in an electrical circuit to the power supply;
   whereby the fuel in the fuel line is heated directly and efficiently by the heating element, and solidifying of fuel in the line in extremely low temperatures is avoided.

2. A heated fuel line for a liquid-fuel engine having a fuel tank, a fuel line leading from the tank to the engine, and an electrical power supply, comprising:
   an elongated electrical resistance heating element, comprising a pair of parallel conductive wires spaced apart and covered by a non-metallic resistance sheath of a radiation cross-linked polymer with free carbon, having the property of being less resistant and producing more heat under low temperatures than under high temperatures,
   said element being inside the fuel line and of substantially less cross sectional area than the fuel line;
   a fitting in the fuel line with means connecting the heating element to the exterior of the fuel line; and
   external wiring connecting the connecting means and both wires of the heating element in an electrical circuit to the power supply;
   whereby the fuel in the fuel line is heated directly and efficiently by the heating element, and solidifying of fuel in the line in extremely low temperatures is avoided.

3. A heated fuel line according to claim 1 or 2, wherein the heating element extends through the length of the fuel line, between the fuel tank and a fuel filter adjacent to the engine.

4. A heated fuel line according to claim 2, wherein the means connecting the heating element to the exterior of the fuel line comprises an opening in the fitting, from interior to exterior, with the heating element extending to and passing through the opening to the exterior of the fuel line, and including sealing means associated with the opening and the connecting wiring for preventing leakage of fuel from the opening.

5. A heated fuel line according to claim 2, the resistance sheath being in the shape of a flat, thin tape.

* * * * *